United States Patent
Gao et al.

(10) Patent No.: US 11,188,937 B2
(45) Date of Patent: Nov. 30, 2021

(54) GENERATING MACHINE-LEARNED ENTITY EMBEDDINGS BASED ON ONLINE INTERACTIONS AND SEMANTIC CONTEXT

(71) Applicant: Microsoft Technology Licensing, LLC, Redmond, WA (US)

(72) Inventors: Huiji Gao, San Jose, CA (US);
Jianling Zhong, San Jose, CA (US);
Haishan Liu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 15/994,481

(22) Filed: May 31, 2018

(65) Prior Publication Data
US 2019/0370854 A1    Dec. 5, 2019

(51) Int. Cl.
*G06Q 30/00*    (2012.01)
*G06Q 30/02*    (2012.01)
*H04L 29/08*    (2006.01)

(52) U.S. Cl.
CPC ..... *G06Q 30/0246* (2013.01); *G06Q 30/0275* (2013.01); *G06Q 30/0277* (2013.01); *H04L 67/22* (2013.01)

(58) Field of Classification Search
CPC ............... G06Q 30/02; G06Q 30/0246; G06Q 30/0275; G06Q 30/0277; G06F 16/9535; G06F 17/3053; G06N 99/005; G06N 20/00; G06N 7/005; H04L 67/22; H04L 67/306; H04L 67/26; H04W 4/21
USPC .................................................... 705/14.53
See application file for complete search history.

(56) References Cited

U.S. PATENT DOCUMENTS

| | | | | |
|---|---|---|---|---|
| 2013/0325755 A1* | 12/2013 | Arquette | ................. | H04L 51/32 706/12 |
| 2015/0006286 A1* | 1/2015 | Liu | ........................ | G06Q 50/01 705/14.53 |
| 2018/0247224 A1* | 8/2018 | Garcia Duran | ......... | G16H 50/20 |
| 2018/0268317 A1* | 9/2018 | Dharwadker | ........ | G06F 16/9535 |
| 2019/0080383 A1* | 3/2019 | Garcia Duran | ...... | G06F 16/9536 |

\* cited by examiner

*Primary Examiner* — Sun M Li
(74) *Attorney, Agent, or Firm* — Nicholson De Vos Webster & Elliott, LLP

(57) ABSTRACT

Techniques for extracting features of entities and targets that can be applied in a set of applications, such as entity selection prediction, audience expansion, feed relevance, and job recommendation. In one technique, entity interaction data is stored that indicates, for each of multiple entities, one or more targets that are associated with items with which the entity interacted. Token association data is stored that indicates, for each of multiple tokens, one or more targets that are associated with the token. Then, using one or more machine learning techniques, entity embeddings and target embeddings are generated based on the entity interaction data and the token association data. Later, a request for content is received from a particular entity. Based on at least one entity embedding, a content item for the particular entity is identified. The content item is transferred over a computer network and presented to the particular entity.

19 Claims, 6 Drawing Sheets

GENERATING MACHINE-LEARNED ENTITY EMBEDDINGS BASED ON ONLINE INTERACTIONS AND SEMANTIC CONTEXT

TECHNICAL FIELD

The present disclosure relates generally to machine learning applications and, more particularly, to using machine learning techniques to learn embeddings in a sparse interaction space of one domain and leveraging those embeddings in another domain.

BACKGROUND

Some online publishers employ an electronic feed that contains multiple viewable content items for online users to view. Each feed presented to a user may be unique in the actual content items that the feed contains and/or the order in which the content items are displayed. Some content items are user selectable, which can result in many different actions, such as opening a new browser window and loading content pointed to by the selected content item, opening a locally-installed application, or playing video or audio content the feed slot that contained the selected content item. A feed may be "infinitely" scrollable in that, as a user scrolls through the feed, a different content item is displayed.

A feed may also allow different types of interactions with each displayed content item or a subset of content items. Examples types of interactions include commenting, liking, sharing, and following. For example, if a user is allowed to comment on a content item, then a user is allowed to add text comprising a comment related to the content of the content item. Other users, such as friends or connections of the user, may be notified that the user provided a commented on the content item. Thus, interactions by a first user with respect to a content item may cause that same content item to be displayed to other users, such as other users in the same social network as the first user.

Many publishers wish to provide new (or "fresh") content to respective users' feeds. As a result, many content items in a feed do not persist in that feed very long. For example, a publisher may prevent the same content item from being displayed multiple times to the same user. As another example, if a user has not viewed a feed for a period of time, any content items that would have been displayed during that period of time will not be displayed, or are pushed down so far in the feed such that users would have to scroll extensively in order for those content items to be displayed.

Because content items in feeds do not persist for very long, it may be difficult to leverage user interactions with such content items to infer in what those and other users might be interested. Specifically, one challenge is how to extract valuable information from sparse interactions on (or with respect to) a feed. Another challenge is to leverage information on a feed in other domains or contexts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are provided for overcoming the curse of dimensionality by reducing the dimension space and extracting features of entities (i.e., users) and targets that can be applied in a set of applications, such as entity selection prediction, audience expansion, feed relevance, and job recommendation. In one technique, a unified model is developed to learn embeddings for individual users and individual targets (e.g., organizations) based on matrix factorization. The unified model may capture one or more types of information, such as entity-target interactions, target similarity in terms of semantic context, and/or entity similarity based on social connections.

Advantages of this technique include (1) learning user embeddings and target embeddings through one or more types of interactions between users and targets, (2) (optionally) capturing both social connections and semantic context, and (3) addressing user-target sparsity from traditional methods. The user embeddings and/or target embeddings may be leveraged in multiple novel ways.

System Overview

Figure 1:
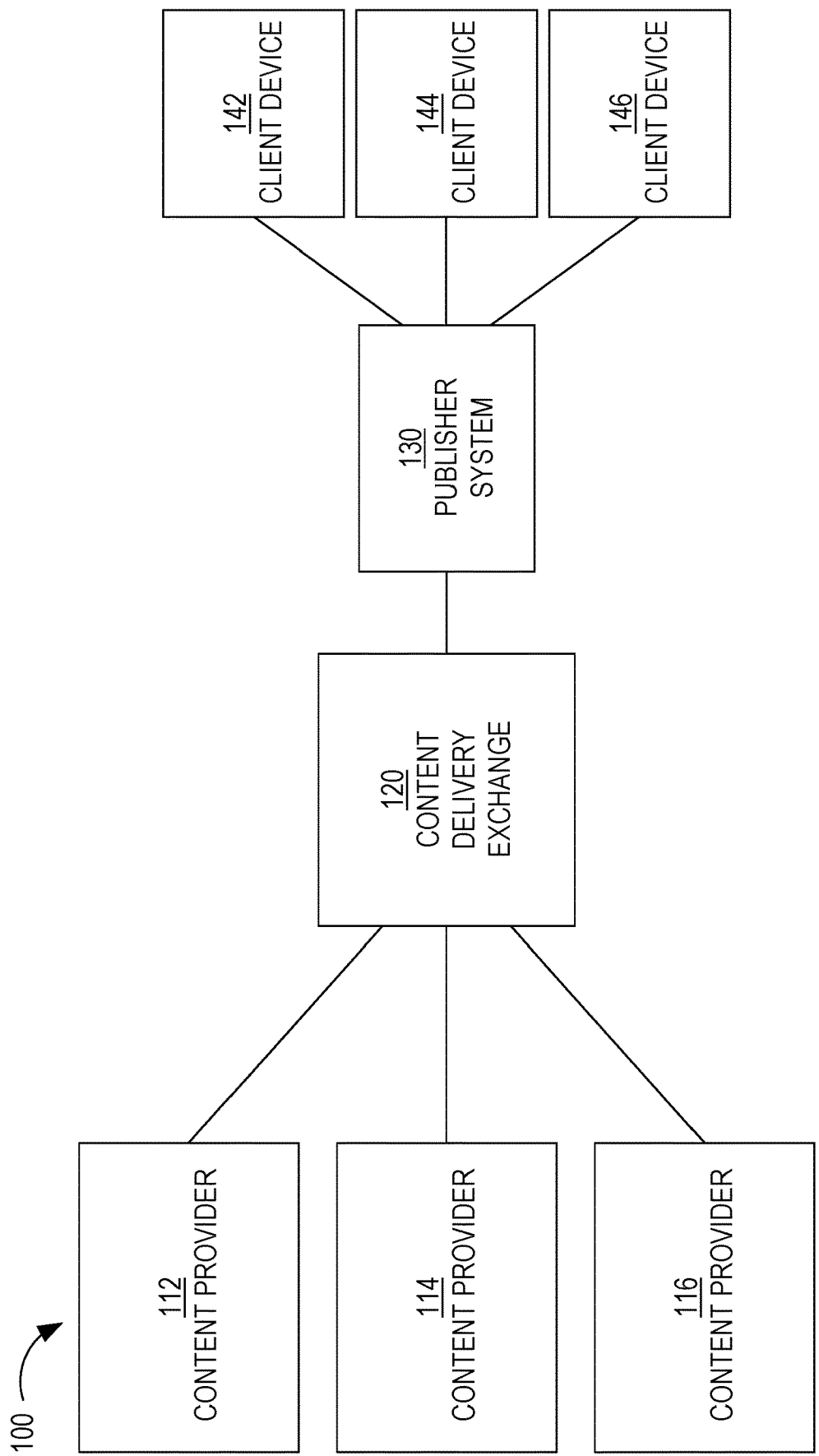
FIG. 1 is a block diagram that depicts a system for distributing content items to one or more end-users.

FIG. 1 is a block diagram that depicts a system 100 for distributing content items to one or more end-users, in an embodiment. System 100 includes content providers 112-116, a content delivery exchange 120, a publisher system 130, and client devices 142-146. Although three content providers are depicted, system 100 may include more or less content providers. Similarly, system 100 may include more than one publisher system (i.e., from other publishers) and more or fewer client devices.

Content providers 112-116 interact with content delivery exchange 120 (e.g., over a network, such as a LAN, WAN, or the Internet) to enable content items to be presented, through publisher system 130, to end-users operating client devices 142-146. Thus, content providers 112-116 provide content items to content delivery exchange 120, which in turn selects content items to provide to publisher system 130 for presentation to users of client devices 142-146. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange 120 may comprise multiple computing elements and devices, connected in a local network or distributed regionally or globally across many networks, such as the Internet. Thus, content delivery exchange 120 may comprise multiple computing elements, including file servers and database systems.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher system 130 or by the client device that requested the original content from publisher system 130. For example, a client device that renders a web page initiates (e.g., based on code within the web content) one or more calls (or HTTP requests) to content delivery exchange 120 for one or more content items. In response, content delivery exchange 120 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher system 130 may be owned and operated by the same entity or party. Alternatively, content delivery exchange 120 and publisher system 130 are owned and operated by different entities or parties.

A content item may comprise an image, a video, audio, text, graphics, virtual reality, or any combination thereof. A content item may be presented on within different portions of requested (e.g., web) content, such as the top of a web page, on the right side ("right rail") of a web page, or the bottom of a web page. A content item may be presented within a feed of content items or outside any such feed, if one exists in the requested content. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher system 130) to present content items on behalf of multiple content providers. Thus, a bidder is another source of content items that content delivery exchange 120 may select for presentation through publisher system 130. Thus, a bidder acts as a content provider to content delivery exchange 120 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

A content provider may establish a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/ service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a resource budget that indicates how much the corresponding content provider is willing to be charged by content delivery exchange 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 120 receives triggers a content item selection event.

For example, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 120 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 120 conducts one or more content item selection events. Thus, content delivery exchange 120 has access to all data associated with planning of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not know (a) which content item was selected if the selected content item was from a different source than content delivery exchange 120 or (b) the bid prices of each content item that was part of the content item selection event. Thus, the other exchange may provide, to content delivery exchange 120 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 120 tracks one or more types of user interactions across client devices 142-146 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item.

Online Interactions

There are at least two types of online interactions: between users and between users and targets. Examples of a target include an organization, a group of (e.g., similar) organizations, a content delivery campaign, a group of content delivery campaigns, a content item, and a group of content items. Examples of an organization include a company, a non-profit organization, a government agency, and an academic institution.

An example of a user-user interaction is one user establishing a connection in a social network with another user, one user (optionally) composing and causing an electronic message to be sent to another user, two users exchanging electronic messages, and one user interacting with (e.g., commenting, sharing, liking) content generated by another user.

Examples of a user-target interaction is a user following an organization (in the scenario where the target is an organization), a user selecting a content item (in the scenario where the target is a content item), and a user interacting with (e.g., commenting, sharing, liking, clicking) a content item associated with the target. "Following an organization" involves a user providing data (e.g., a click) that causes the user to subscribe to receiving future content that is pertinent to the organization, such as content provided by the organization or content that contains information about the organization. A challenge given user-target interactions is efficiently leveraging such information together to infer a user's preference on (or interest in) a target, even if the user has never interacted before with the target or with content provided by (or otherwise associated with) the target.

In an embodiment, user-target interactions are represented in a matrix where, for example, rows in the matrix correspond to users and columns in the matrix correspond to targets. Matrix factorization is used to factorize the matrix, i.e., to find out two (or more) matrices such that when they are multiplied together, the original matrix (or at least something close to it) will result. From an application point of view, matrix factorization is used to discover latent features underlying the interactions between two different entities.

Learning Embeddings

In an embodiment, a matrix factorization is used to learn entity (or user) embeddings and target embeddings from user-target interactions:

$$\min_{U,V} W \odot \|M-UV^T\|_2$$

where $W \odot \|M-UV^T\|_2$ models user-target interactions, W is an implicit feedback matrix, M is a user-target interaction matrix (and is an example of entity interaction data), U is a user embedding matrix, and V is a target embedding matrix. W is computed from M and has the same dimension as M. Specifically, $W_{i,j}=1$ if $M_{i,j}>0$ and $W_{i,j}=0$ if $M_{i,j}<=0$. M indicates whether there is a user-item action in M at position {i, j}. Including W can force the loss function to only consider non-zero values in M. For zero values in M, it is not known whether the user did not get a chance to view an item or the user viewed the item but not like it. Without W, bias results will be generated under the assumption that a user does not like an item if the user did not see the item. The operation corresponding to the circle with a dot is an element-wise product, i.e., each element (i, j) in W is multiplied by a corresponding element in the result of $(M-UV^T)$ at the same position (i, j).

Each row in matrix M corresponds to a different user and each column in M corresponds to a different target. Thus, $M_{i,j}$ refers to a particular cell in M and the value therein indicates whether user i interacted with target j. Thus, a value in a cell may be 0 (indicating no interaction) or 1 (indicating that an interaction occurred). In a related embodiment, a value may be one of multiple values, each value corresponding to a different type of interaction. For example, a user "liking" a target (or content provided by a target) may be 0.4, while a user commenting on a target (or content provided by a target) may be a 0.8, while a user "sharing" a target (or content provided by a target) may be 0.9.

In a related embodiment, the value in a cell in M may indicate a number of interactions that the corresponding user had with the corresponding target. If a target j is a content provider and the content provider has provided four content items that a user i has selected, then the value in $M_{i,j}$ may be '4'.

The interactions reflected in M may be limited to certain types of interactions. For example, the interactions reflected in M may be limited to interactions that occurred in users' feeds. Alternatively, the interactions reflected in M may be limited to interactions with non-feed items, such as content items that appear at the top of web pages, on the right side of web pages, and/or at the bottom of web pages, regardless of whether such web pages include a (e.g., scrollable) feed. Alternatively still, the interactions reflected in M may include all (or multiple) types of interactions, such as clicks, likes, shares, and comments. Thus, for example, a particular user likes a first content item (e.g., in a feed) that is provided by a first content provider, clicks on a second content item (e.g., not in a feed) that is provided by a second content provider (that is different than the first content provider), and comments on a third content item that references (or is about) a third organization that is different than the first and second content providers.

In a related embodiment, different type of click information is stored separately from each other and is separately analyzed in order to generated M. For example, like information is stored in a first storage, comment information is stored in a second storage, share information is stored in a third storage, follow information is stored in a fourth storage, and click information is stored in a fifth storage.

In a related embodiment, even though a content item is not provided by an organization, the content item may still be associated with the organization. For example, a first user of publisher system 130 composes and posts an electronic article that references organization X. A second user (who may be a "friend" or connection of the first user) of publisher system 130 views the article (e.g., in the second user's feed) and clicks a "like" button adjacent to the electronic article. When M is updated or generated, this "liking" is reflected in the appropriate cell that corresponds to the second user and organization X.

Each row in U corresponds to a different user and comprises an embedding for that user. An embedding is a vector of real numbers. Each column in U corresponds to a different dimension. Each row in V corresponds to a different target and comprises an embedding for that target. Each column in V corresponds to a different dimension. The number of columns in each of U and V is the same. Thus, each user embedding and each target embedding has the same number of dimensions and is the same vector length.

In an embodiment, user embeddings and target embeddings are learned using gradient descent. The process for learning the embeddings involves continuously adjusting user and target embeddings in U and V, respectively, in order to minimize the result (or error) of $M-UV^T$. $V^T$ is the transpose of V. Initially, the values in each cell of U and V are initialized to random (or pseudo random) values. Then, for each pair of user-target embeddings, a determination is made regarding how different their product is to the actual value (e.g., either 0 or 1) of the user-target pair in M. (In vector multiplication, a row vector is multiplied with a column vector to yield a single value. Thus, the result of $UV^T$ is a matrix of the same size and dimensions as M.) This difference is minimized iteratively for each user-target pair. Such a method is called gradient descent, which aims at finding a local minimum of the difference. Traditionally, dradient descent is an optimization algorithm that is used to find the values of a function's parameters (coefficients) that minimizes a cost function. Here, gradient descent is used to find (or learn) user and target embeddings (rather than parameters of a function) that minimizes a cost function.

In an embodiment, user embeddings and target embeddings are learning regularly, such as every month, every week, or every day. Thus, a new version of matrix M is created in order to update user embeddings for certain users and, optionally, learning user embeddings for new users that are not reflected in a prior version of matrix M.

In a related embodiment, regularization is applied during the learning process in order to prevent overfitting. Examples of regularization include L2 and L1/L2.

Leveraging Semantic Context in Learning User and Target Embeddings

In addition, a user's preference on (or interest relative to) a target is not only related to the potential context that the target (e.g., company, campaign, or content item) represents, but also the content of the target, such as content of a content item provided by an organization. Thus, in an embodiment, a target's semantic content is modeled and taken into account when learning user and target embeddings.

The following combines the model for user-target interactions with a model for target semantic content:

$$\min_{U,V} W \odot \|M-UV^T\|_2 + \alpha \|C-TV^T\|_2$$

where C is a token-target matrix (and is an example of token association data), T is a token embedding matrix, $V^T$ is a transpose of the target embedding matrix, and α is a weighting factor.

For example, each row in C corresponds to a different token (e.g., word, phrases or n-grams, or subsets of words) and each column in C corresponds to a different target. Thus, $C_{i,j}$ refers to a particular cell in C and the value therein indicates whether content associated with target j is associated with (e.g., contains) token i. Thus, a value in a cell may be 0 (indicating that the target is not associated with the token) or 1 (indicating that the target is associated with the token). In a related embodiment, a value may be one of multiple values, each value corresponding to a different level of match. For example, if a target contains a portion of a token, then the value in the corresponding cell may be between 0 and 1.

Because there may be hundreds or thousands of tokens that are tracked in C, C may be a sparse matrix, since very few targets might be associated with multiple of the tracked tokens. For example, many targets may be associated with zero or only one of the tokens.

The tokens tracked in matrix C may be limited by excluding, from consideration, stop words (e.g., "in" "at"), misspellings, and tokens (e.g., words) that only appear once in a token corpus. The remaining tokens may be ranked based on frequency or TF-IDF ("term frequency-inverse document frequency"). TF-IDF is a numerical statistic that is intended to reflect how important a token is to a document in a collection or corpus of documents. The TF-IDF value of a token increases proportionally to the number of times the token appears in a document and is offset by the frequency of the token in a corpus that includes the document. The offset helps to adjust for the fact that some tokens appear more frequently in general. After calculating a TF-IDF value for multiple tokens, the multiple tokens are ranked based on their respective TF-IDF value and the top N ranked tokens are selected for tracking in matrix C.

If targets are content items (e.g., ads, promotions, articles, profile updates), then the number of columns (corresponding to the targets) in matrix C may be relatively high, since some organizations (e.g., content providers) may provide/initiate many content items and/or content delivery campaigns, each containing one or more content items. If targets are organizations, then the number of columns in matrix C may be relatively low, since there are likely fewer organizations than content items that are published through publisher system 130.

In an embodiment where targets are organizations, in order to generate matrix C (which is a sparse matrix), for each organization, multiple content items associated with the organization are analyzed to determine whether a cell (in matrix C) corresponding to the organization and a token should contain data that indicates that the organization is associated with that token. For example, for each organization and for each token that is tracked, content items associated with the organization are analyzed to determine whether at least one content item contains the token. If so, the cell in matrix C corresponding to (1) the organization and (2) the token is updated.

In a related embodiment, a cell in matrix C may be a number that indicates a number of content items (associated with the corresponding organization) in which the corresponding token appears. For example, if "data mining" is a token that is tracked in matrix C and appears in two job postings from an organization, three different ads from the organization, and four articles published by the organization, then the cell in matrix C corresponding to that token and that organization may indicate the number nine.

Through machine-learning, token embeddings and target embeddings, respectively, in T and V are learned. Initially, the embeddings in T and V are random (or pseudo random) values. The machine-learning process involves iteratively adjusting token embeddings and target embeddings in T and V, respectively, in order to minimize the result (or error) of $(C-T*V^T)$. $V^T$ is the transpose of V. The result of $T*V^T$ is a matrix of the same size and dimensions as C.

In an embodiment, the target embeddings in both instances of V in the above combined model are constrained so that they are equal. The specific $V_j$ would be learned as a value that causes the minimal loss in the loss function.

Leveraging User Similarity in Learning User Embeddings

In an embodiment, profile information of users is used when learning user embeddings. The following model may be added to the model for user-target interactions and, optionally, the model for target semantic content:

$Tr(U^T L_u U)$: modeling user-user interactions
where $L_u$ is a user Laplacian matrix, U is the user embedding matrix, $U^T$ is a transpose of the user embedding matrix, and Tr is a trace function that takes the sum of the diagonal elements of a matrix. $L_u = D-S$, where D is a diagonal matrix with the $i^{th}$ diagonal element $D(i, i) = \Sigma_j S(j, i)$, and S is a pre-computed user similarity matrix that is based on a user's common actions on items. A Laplacian matrix is a representative of a user similarity graph. A Laplacian matrix makes the mathematical calculation and derivation easier. $S_{i,j}$ corresponds to a similarity between user I and user j. The similarity can be computer from user actions on items, such as M, or from common profile attributes.

Thus, user embeddings, target embeddings, and token embeddings may be learned based on the following formula:

$$\min_{U,V} W \odot \|M-UV^T\|_2 + \alpha * \|C-TV^T\|_2 + \beta * Tr(U^T L_u U)$$

which combines user interaction data, token association data, and user profile information in order to learn the appropriate embeddings across multiple latent dimensions.

Example Process

Figure 2:
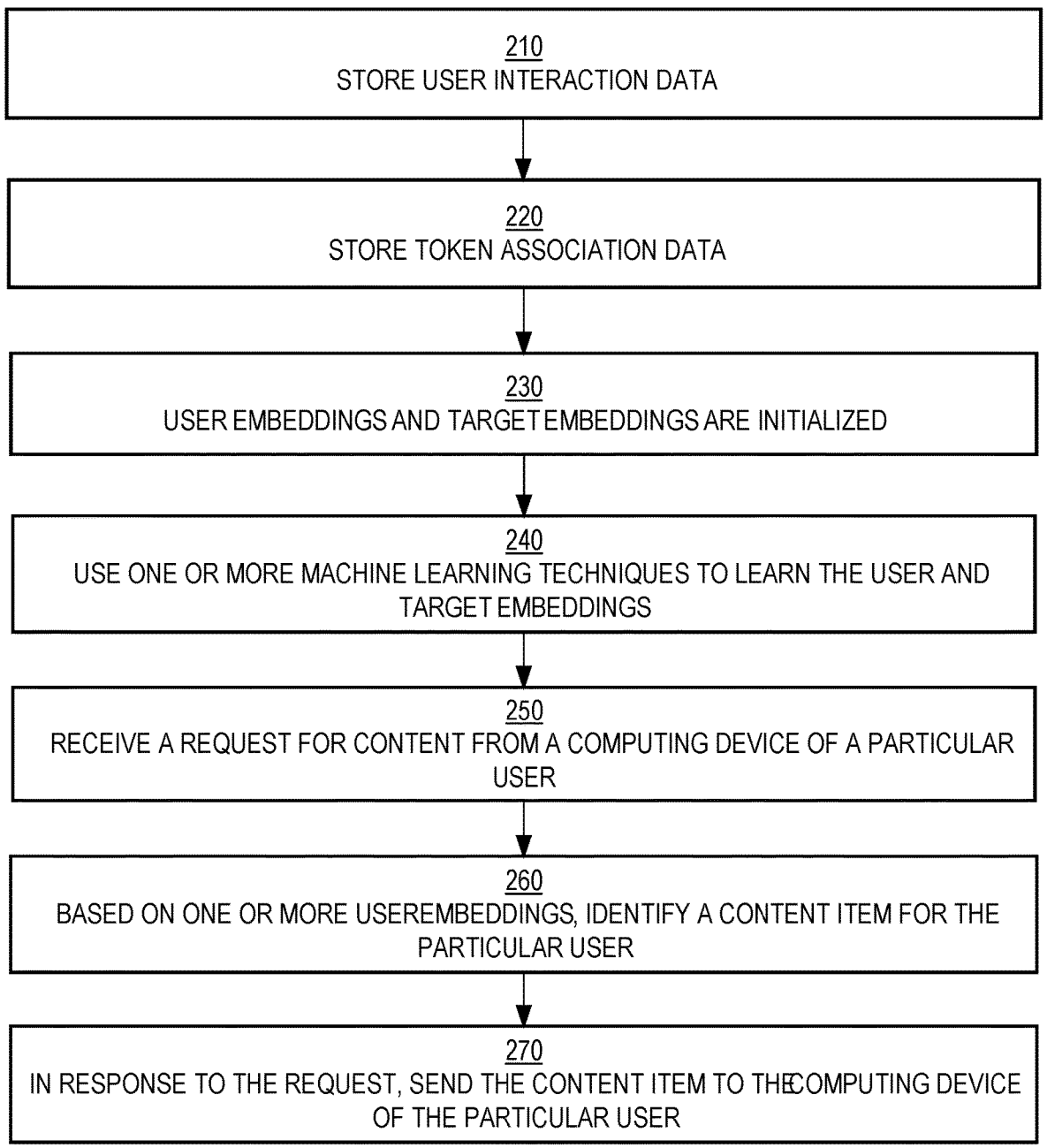
FIG. 2 is a flow diagram that depicts a process for generating user and target embeddings, in an embodiment.

FIG. 2 is a flow diagram that depicts a process 200 for generating user and target embeddings, in an embodiment. Process 200 may be implemented by content delivery exchange 120, publisher system 130, a system that is associated with exchange 120 or system 130, or any combination thereof.

At block 210, user interaction data is stored. The user interaction data indicates, for each user of a plurality of users and for each target of a plurality of targets, an indication of whether the user interacted with content associated with the target.

At block 220, token association data is stored. The token interaction data indicates, for each token of a plurality of tokens and for each target of the plurality of targets, an indication of whether the target is associated with the token.

At block 230, a plurality of user embeddings, a plurality of target embeddings, and a plurality of token embeddings are initialized. Such initialization may involve setting all values to 0 or another value or determining a random (or pseudo random) value for each embedding.

At block 240, one or more machine learning techniques are used to revise or learn embeddings that minimize a cost function, such as $$\min_{U,V} W \odot \|M-UV^T\|_2 + \alpha \|C-TV^T\|_2$$

At block 250, a request for content is received from a computing device of a particular user.

At block 260, based on one or more of the user embeddings, a content item for the particular user is identified. Block 260 may be performed by content delivery exchange 120, publisher system 130, or another associated system not depicted.

At block 270, in response to receiving the request, the content item is transferred over a computer network and presented through the computing device of the particular user.

In a related embodiment, the cost function involves taking into account user profile information (in addition to user interaction data and token association data) in order to learn the user embeddings.

In a related embodiment, block 220 is skipped and token embeddings are not learned. Thus, in this embodiment, semantic context is not leveraged in learning user embeddings or target embeddings.

Audience Expansion

In an embodiment, user embeddings that are machine-learned as described above are used to expand a target audience for a content delivery campaign. A target audience may be determined in one of multiple ways as described previously. "Expanding" a target audience (or "audience expansion") involves identifying a set of users, each of which is initially outside the target audience (as defined by the targeting criteria of the content delivery campaign) and including that set of users in the target audience.

Audience expansion may involve identifying a column, in a matrix (e.g., M') that result from multiplying U and $V^T$, that corresponds to a content provider (if V comprises embeddings for content providers) or a content delivery campaign (if V comprises embeddings for a content delivery campaigns). Each value in the identified column corresponds to a different user and is referred to herein as an "affinity score." The affinity score can be generated even though the user might have never selected a content item associated with the target.

Alternatively, instead of multiplying the entirety of $V^T$ with U to generate M', only the appropriate target embedding (in $V^T$) associated with the content delivery campaign is multiplied with each user embedding in U. For example, the user embedding for user i is identified from matrix U (i.e., at $U_i$) and a target embedding for target j is identified from matrix V (i.e., at $V_j$). The affinity score may be generated by multiplying the vector at $U_i$ with the vector at $V_j$. For example, if the user and target embeddings each comprise three values (corresponding to three latent dimensions), then a product of the first value in the user embedding and the first value in the target embedding is calculated, a product of the second value in the user embedding and the second value in the target embedding is calculated, and a product of the third value in the user embedding and the third value in the target embedding is calculated. The sum of the three calculations may represent an affinity score between the user and the target. The greater the affinity score, the greater the (predicted or inferred) affinity that the corresponding user has with the content provider or campaign.

In an embodiment, the users that are already in the initial target audience of the content delivery campaign are excluded from consideration. The other users are ranked based on their respective affinity scores (e.g., in the appropriate column of M') and the top N users are selected for inclusion in the target audience. The exclusion step may occur before or after the ranking step. N may be a value that is determined (or established) by content delivery exchange 120 or by the corresponding content provider. For example, if the content provider desires (e.g., specifies) a target audience of size X, but the target audience is currently Y, then N may be derived by subtracting Y from X (X−Y).

In an embodiment, instead of relying on affinity scores of users relative to a particular target in order to perform audience expansion, audience expansion involves (1) identifying one or more user embeddings of users who are in the initial target audience of a content delivery campaign and (2) comparing their respective user embeddings to user embeddings of users who are not in the initial target audience of the content delivery campaign. Comparing pairs of user embeddings may yield the identification of many pairs of similar users even though (1) each pair of users may not have selected (or interacted with) the exact same content items and (2) each pair of users does not have any words in their respective profiles in common. For example, one user may have selected job postings that refer to "data mining" while another user may have selected other types of content items that refer to "machine learning." Semantically, data mining and machine learning are somewhat similar. However, even an extremely long list of tracked features or dimensions will not reveal that these two users are similar. Nevertheless, in embodiments described herein, user embeddings are learned across relatively few latent dimensions and those user embeddings are used to determine user similarity. In this embodiment, if a user embedding of a non-targeted user is very similar (e.g., above a pre-defined threshold) to a user embedding of a targeted user, then the non-targeted user is added to the target audience.

In an embodiment, the user embeddings and, optionally, target embeddings that are relied upon to perform audience expansion may be based on a matrix M that includes all types of user interactions with content provided by publisher system 130 or is limited to feed-related interactions, non-feed-related interactions, and/or ad-related interactions.

Figure 3:
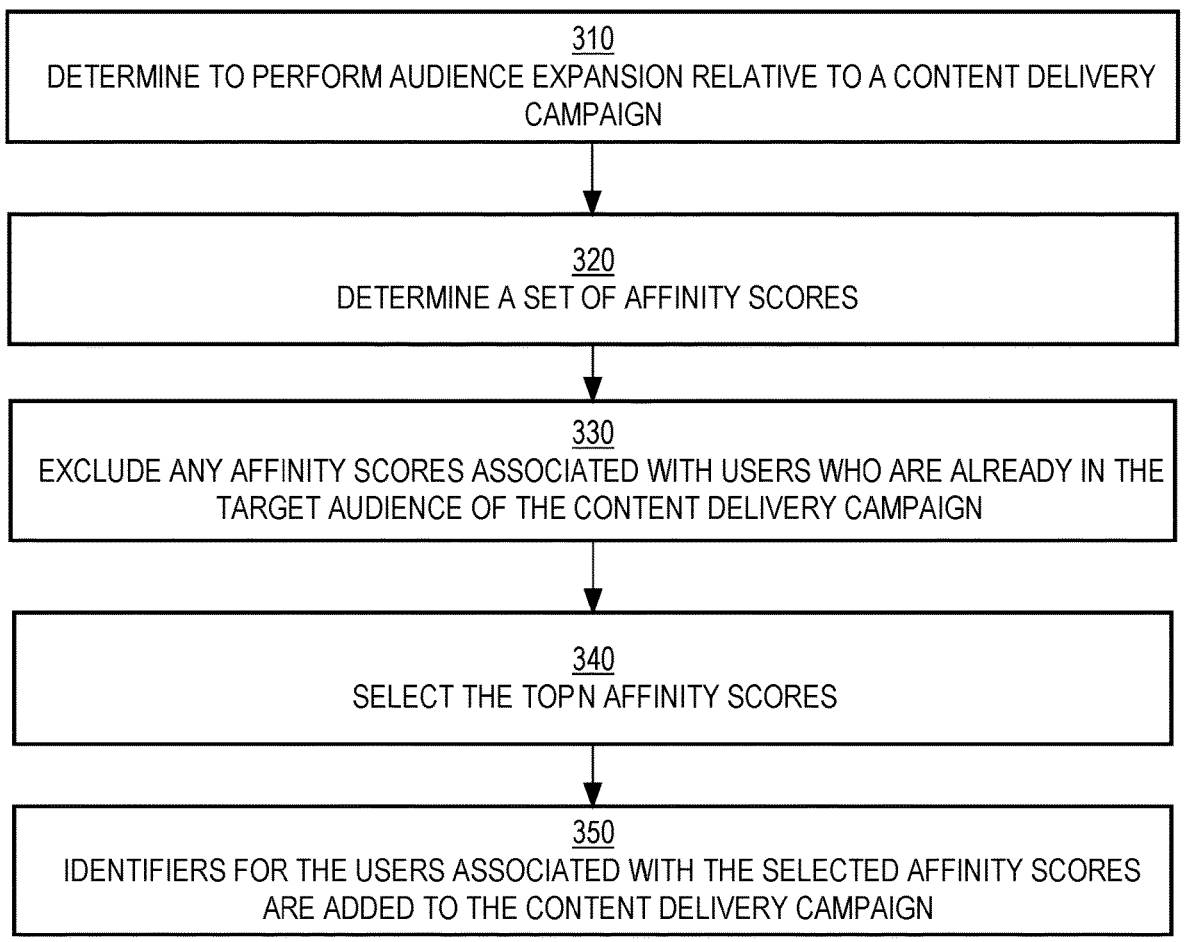
FIG. 3 is a flow diagram that depicts a process for leveraging learned embeddings in audience expansion, in an embodiment.

FIG. 3 is a flow diagram that depicts a process 300 for leveraging learned embeddings in audience expansion, in an embodiment. Process 300 may be implemented by content delivery exchange 120 or by a system associated with exchange 120.

At block 310, it is determined that audience expansion will be performed relative to a content delivery campaign. Block 310 may be performed in response to determining that an initial target audience of the content delivery campaign is below a first threshold, that the number of impressions or selections of content item(s) associated with the content delivery campaign is below a second threshold, or in response to input from the corresponding content provider.

At block 320, a set of affinity scores is determined. Each affinity score in the set is derived based on a user embedding and one or more target embeddings associated with the corresponding content provider, such as a target embedding for the content provider, target embeddings associated with multiple content items provided by the content provider, or by one or more target embeddings associated with one or more other content delivery campaigns that were initiated by, for example, the content provider. Each affinity score is derived based on a different user embedding but the same one or more target embeddings.

The set of affinity scores may have been generated prior to process 300 or in response to the determination in block 310. For example, after user embeddings were learned in matrix U and target embeddings were learned in matrix V, both matrices are combined to generate M', as described above. A column in M' that corresponds to the appropriate target (whether the target is the content provider, a prior content delivery campaign initiated by the content provider, or a content item provided by the content provider) contains the set of affinity scores and may be read as part of block 320. As another example, instead of generating M' based on matrices U and V, user embeddings from U are read and, for each user embedding, that user embedding is applied to a target embedding (or combination of multiple target embeddings) in matrix V that is associated with the content provider.

At block 330, affinity scores that are associated with users that are already in the target audience of the content delivery campaign are excluded from the set of affinity scores. In a related embodiment where the set of affinity scores is not generated until block 320, prior to block 320, user embeddings that are associated with users that are already in the target audience of the content delivery campaign are ignored. Thus, affinity scores of such users are not generated.

At block 340, the top N affinity scores are selected. The number of affinity scores selected may be determined by the content provider that initiated the content delivery campaign or by content delivery exchange 120.

At block 350, the users that are associated with the selected affinity scores are considered the expanded audience and their corresponding identifiers are added to the content delivery campaign.

Predict User Selection Rate

As described previously, each cell in M' (which is the product of U and $V^T$ after the respective embeddings are learned) represents an affinity score relative to a particular user and a particular target. The affinity score for the particular user and the particular target is generated based on a user embedding "learned" for the particular user and a target embedding "learned" for the particular target (as described previously). Examples of types of targets include a content item, a content delivery campaign, and a content provider.

In an embodiment, an affinity score is used as a feature in a prediction model that predicts a user selection rate for a user relative to a particular content delivery campaign or content item. An example of a user selection rate is a click-through rate (CTR).

For each content item selection event where a set of candidate content delivery campaigns (or content items) are identified as candidates for selection, a set of affinity scores is generated, one affinity score for each content delivery campaign (or content item) in the set of candidate campaigns/content items. Thus, if there are ten candidate content delivery campaigns, then ten affinity scores are generated, each based on the same user embedding but on a different target embedding from matrix V. A predicted user selection rate is generated for each candidate in the set using a prediction model that accepts multiple feature values, one of which includes an affinity score that is generated based on the candidate's embedding.

In an embodiment, the user and target embeddings that are relied upon to generate a predicted user selection rate may be based on a matrix M that includes all types of user interactions with content provided by publisher system 130 or is limited to feed-related interactions, non-feed-related interactions, and/or ad-related interactions.

Figure 4:
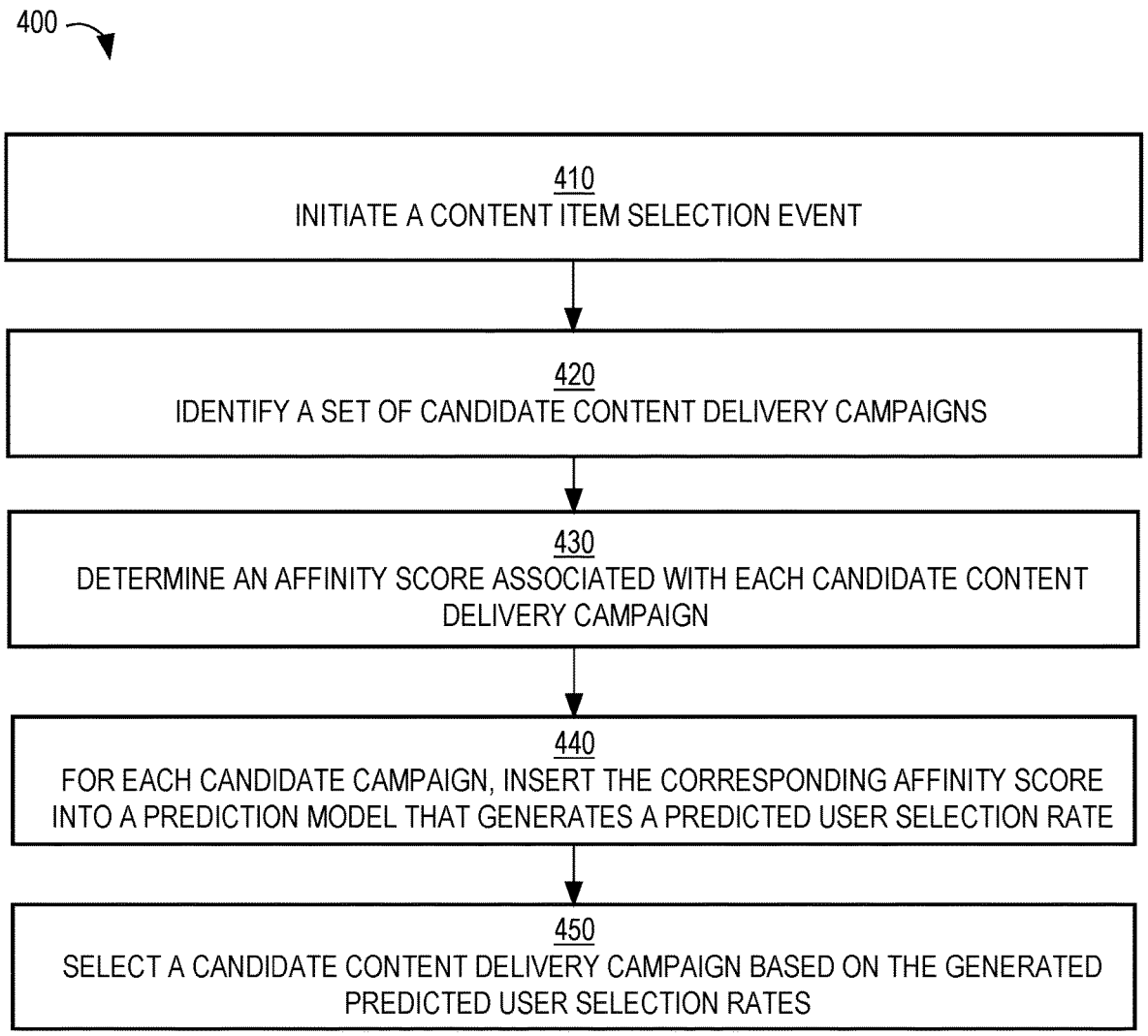
FIG. 4 is a flow diagram that depicts a process for leveraging learned embeddings in predicting user selection rate, in an embodiment.

FIG. 4 is a flow diagram that depicts a process 400 for leveraging learned embeddings in predicting user selection rate, in an embodiment. Process 400 may be implemented by content delivery exchange 120 or by a system that is associated with exchange 120.

At block 410, a content item selection event is initiated. Block 410 may be performed in response to content delivery exchange 120 receiving a request from client device 142 for content to insert into a certain portion of a web page that is rendered (or is being rendered) on client device 142.

At block 420, a set of candidate content delivery campaigns is identified. A user or client device that initiated the content item selection event is mapped to a particular user. The particular user is determined to be part of a target audience for each candidate content delivery campaign in the set of candidate content delivery campaigns.

At block 430, an affinity score associated with each candidate content delivery campaign in the set is determined. Each affinity score is based on a user embedding that is associated with the particular user and a target embedding that is associated with the corresponding content delivery campaign. The target embedding may be at the level of a content provider, a content delivery campaign, or a content item.

The affinity scores may have been generated prior to process 400 or in response to the performance of block 410. For example, after user embeddings were learned in matrix U and target embeddings were learned in matrix V, both matrices are combined to generate M', as described above. A cell at (1) the column in matrix M' that corresponds to the appropriate target (whether the target is the content delivery campaign, the corresponding content provider, a prior content delivery campaign initiated by the content provider, or a content item provided by the content provider) and (2) the row in matrix M' that corresponds to the particular user may be read as part of block 420. As another example, after block 420, instead of generating M' based on matrices U and V, a user embedding from U that corresponds to the particular user is read and, for each target embedding that corresponds to a candidate content delivery campaign in the set, that target embedding (or a combination of multiple target embeddings) in matrix V is applied to the user embedding to generate an affinity score for that candidate content delivery campaign.

At block 440, for each candidate content delivery campaign, the affinity score for that candidate campaign is inserted into a prediction model (e.g., along within one or more feature values associated with the particular user and/or the candidate campaign), which generates, based on the affinity score, a predicted user selection rate with respect to that candidate campaign.

At block 450, a candidate content delivery campaign is selected based on the predicted user selection rates generated in block 440. For example, the candidate campaign associated with the higher predicted user selection rate is selected for the content item selection event and an associated content item is sent to a computing device associated with the particular user. As another example, each predicted user selection rate is multiplied by a bid amount that is associated with the corresponding content delivery campaign to generate an effective cost per impression (ecpi). The candidate campaign associated with the highest ecpi is selected as part of the content item selection event.

Job Recommendation

In an embodiment where the target is an organization (e.g., company), user embeddings associated with a particular organization are used to determine which of the corresponding users will receive a job recommendation. A job recommendation is associated with a particular organization. A job recommendation may be a notification that is pushed (or sent) to a user, such as a text message, an email message, or an application notification. Alternatively, a notification to a user is displayed to the user when the user logs into an online system. For example, upon logging in to a user's account, a home page is presented to the user. A certain portion of the home page (e.g., on the right rail or in a news feed) may be dedicated to displaying jobs in which the user may be interested.

Different factors may be considered in determining which users will receive a job recommendation. One of the factors is an affinity score that is based on the user embedding of the corresponding user i ($U_i$) and the target embedding of the corresponding organization ($V_j$). As described above, the higher the affinity score, the higher the affinity between the corresponding user and the corresponding target.

An affinity score may be a first pass filter or a subsequent filter in selecting one or more job recommendations for a user. In one example process for selecting a set of job recommendations to present to a user, a first set of candidate job recommendations for a user is identified using one or more criteria that does not include an affinity score. Then, the first set of candidate job recommendations is ranked based on an affinity score generated for each job recommendation relative to the user. Platform system 130 may select the top N ranked job recommendations to present to the user. In another example process for selecting a set of job recommendations to present to a user, an affinity score is generated for each candidate job recommendation (e.g., from among all possible candidate job recommendations) relative to a user. The affinity scores are used to rank the candidate job recommendations. The top N ranked candidate job recommendations are either selected for presenting to the user or are, first, further ranked based on one or more other criteria (i.e., that do not include an affinity score relative to the user).

Feed Rank Refinement

Similar to job recommendations, affinity scores for candidate feed items that might appear in a user's feed are generated and may be used in one of the two example processes. For example, a first set of candidate feed items for a user is identified using one or more criteria that does not include an affinity score (i.e., generated using learned embeddings). Then, the first set of candidate feed items is ranked based on an affinity score generated for each candidate feed item relative to the user. Platform system 130 may select the top N ranked feed items to present to the user. As another example, an affinity score is generated for each candidate feed item (e.g., from among all possible candidate feed items) relative to a user. The affinity scores are used to rank the candidate feed items. The top N ranked candidate feed items are either selected for presenting to the user or are, first, further ranked based on one or more other criteria (i.e., that do not include an affinity score relative to the user).

Figure 5:
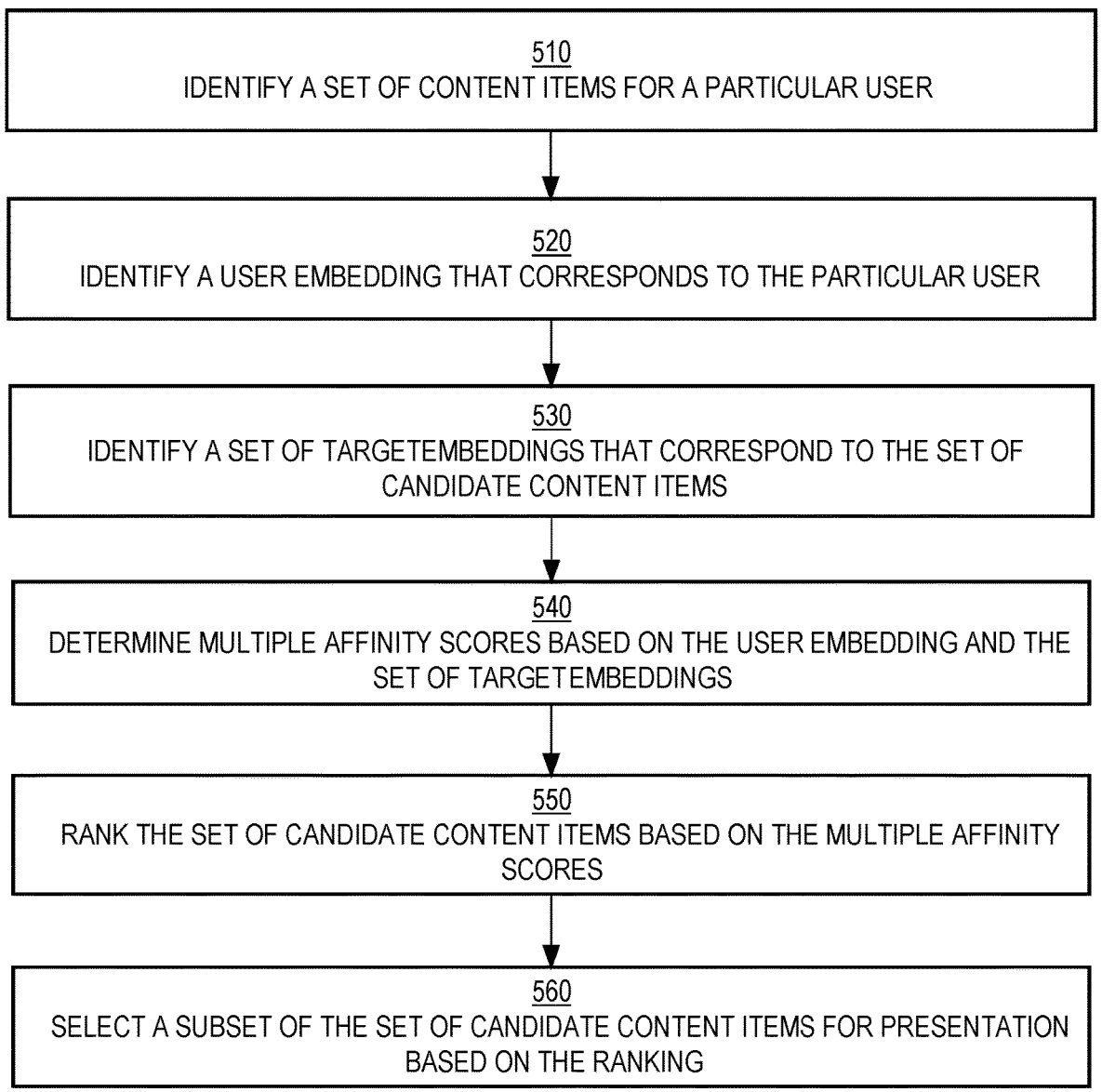
FIG. 5 is a flow diagram that depicts a process for leveraging learned embeddings in selecting content items for presentation, in an embodiment.

FIG. 5 is a flow diagram that depicts a process 500 for leveraging learned embeddings in selecting content items for presentation, in an embodiment. Process 500 may be implemented by content delivery exchange 120, publisher system 130, or a system that is associated with exchange 120 or system 130.

At block 510, a set of candidate content items is identified for a particular user. Block 410 may be performed in response to receiving a content request initiated by the particular user. Alternatively, block 410 may be performed prior to (or in anticipation of) a content request initiated by the particular user. One or more content items in the set of candidate content items may be not be part of any content delivery campaign initiated by a third-party content provider. For example, at least some of the candidate content items may be content that publisher system 130 determines may be relevant to the particular user, such as content items that describe jobs in which particular user might be interested, content items that describe careers in which the particular user might be interested, content items that refer to people in whom the particular user might be interested, content items that describe video courses in which the particular user might be interested.

At block 520, a user embedding that corresponds to the particular user is identified. The user embedding is located at a particular row in matrix U.

At block 530, a set of target embeddings that corresponds to the set of candidate content items is identified. Each candidate content item is associated with a different entry (e.g., row) in matrix V. For example, targets matrix V may correspond to content items, content delivery campaigns, or content providers. Each of the target embeddings is found located at a different entry in matrix V.

At block 540, based on the user embedding and the set of target embeddings, multiple affinity scores are determined. Each affinity score is generated based on the user embedding and a different target embedding in the set of target embeddings. Blocks 520-540 may be performed prior to block 510. For example, the user embedding and the target embeddings may have been automatically applied to each other when computing matrix M', which may have occurred prior to block 510.

At block 550, based on the affinity scores, the set of candidate content items is ranked.

At block 560, based on the ranking, a subset of the set of candidate content items is selected for presentation on a computing device to the particular user. For example, the top N (e.g., five or eight) ranked candidate content items are selected.

User-User Interactions

Matrix M described herein is a matrix of user-target interactions, where, for example, a user selects a content item associated with a target, a user visits a profile page associated with a target, or a user provides a comment on an article/posting that contains information about the target.

In a different embodiment, a matrix P contains user-to-user interaction data. For example, each row in matrix P corresponds to a different user in a set of users and each column in matrix P corresponds to a different user in the same set of users. Thus, matrix P is a square matrix (i.e., equal number of rows and columns). A first user "interacts" with a second user if the first user performs an online action with respect to content that is associated with the second user. As examples, a first user sends (or causes to send) an electronic message to the second user, the first user comments on an article posed by the second user, the first user likes a comment made by the second user, the first user visits a profile page of the second user, the first user sends, to the second user, an invitation request to connect on a social network, and the first user accepts an invitation request from the second user.

Using the techniques described herein, user embeddings are generated for each user. Through matrix factorization and gradient descent (e.g., $\min_{U,V} W^* \| P-QR^T \|_2$), matrix Q contains user embeddings of users interacting with content associated with other users and matrix R contains user embeddings of users whose associated content was interacted with by another user. Once the user embeddings are learned, then user embeddings in both Q and R may be leveraged. A user embedding corresponding a first user from Q combined with a user embedding corresponding to a second user from R reflects the first user's affinity to content associated with the second user.

For example, given a set of candidate content items, each associated with a different user in matrix R, a user embedding from matrix Q corresponding to a particular user is combined (e.g., multiplied) with each user embedding from matrix R (that is associated with a candidate content item) to generate an affinity score. The candidate content item that is associated with the highest affinity score is selected for display to the particular user. An example of the set of candidate content items may be online postings from the users. As another example, each candidate content item may be a user-selectable (e.g., clickable) graphical element that invites the particular user to connect with the user that corresponds to the candidate content item.

As another example, user embeddings from both matrices may be leveraged to determine which users are likely to interact with a particular user's content. Thus, given a single content item associated with (e.g., containing content composed by) a particular user, an affinity score is generated relative to a set of users whose embeddings are reflected in matrix Q. Thus, the user embedding at $Q_i$ is combined with the particular user's user embedding at $R_j$ to compute a first affinity score, the user embedding at $Q_{i+1}$ is combined with the particular user's user embedding at $R_j$ to compute a second affinity score, and so forth. The users associated with highest affinity scores will receive content associated with the particular user.

New Users

New users may request content from publisher system 130 from time to time. A "new" user may be an unregistered user that is not associated with any profile or connection information or may have limited amount of such information, such as one or more known connections in an online social network and/or has provided some profile information, such as residence information, job title, an employment history. However, many new users might not be reflected in matrix U, at least users that are detected after user embeddings in matrix U were last learned. Also, some known users may have little selection or interaction history with content items presented through publisher system 130. Such users may be excluded from matrix U.

In an embodiment, one or more users that are similar to a new user are identified and their respective user embeddings are used to associate a user embedding for the new user. For example, a user embedding of a user that is connected to the new user in an online social network is associated with the new user. Thus, a similar user may be one that is identified as a "friend" or connection of the new user in an online social network. Each connection of a new user may be considered a similar user, or at least is considered as a candidate similar user, after which additionally filtering may be used to remove one or more candidate similar users.

Another way to identify one or more similar users to a new user is to compare respective profile information, whether the profile information is explicitly provided by the respective users or inferred. Each user may be associated with a vector, each entry in the vector corresponding to a different attribute. If two users have the same attribute value for a particular attribute, then there is a match for that attribute. The greater the number of matches between two users, the more similar the two users are. Some attributes may be weighted higher than others. For example, the fact that two users have the same current employer may be weighted higher than the fact that the two users reside in the same country. Thus, a match along a particular attribute may be greater than '1.' Totaling the matches results in a similarity score. If a particular user and a new user have a similarity score above a particular threshold, then the particular user is considered similar to the new user. Thus, if similarity scores of multiple users are above the particular threshold, then all the multiple users are considered similar users.

If multiple users are identified as similar to a new user, then multiple user embeddings of the multiple similar users are combined (e.g., averaged) to generate a combined user embedding for the new user. Such a user embedding may be used to (a) include the new user in a target audience of a content delivery campaign, (b) generate a predicted user selection rate for the new user, and/or (c) identify one or more content items (e.g., job recommendations, feed items, etc.) for the new user.

Another possible way to determine a user embedding for a new user is to combine (e.g., average) all the learned user embeddings in matrix U (or the latest version thereof).

New Organizations

In addition to new users, new organizations may be detected. For example, after target embeddings in matrix V are learned, a new content provider registers with content delivery exchange 120 and initiates one or more content delivery campaigns. Without a target embedding for the new content provider, performing audience expansion, predicting user selection rates, and other applications described above that require a target embedding will be impossible. Thus, in an embodiment, a target embedding for a new organization is determined based on one or more target embeddings for one or more organizations that are determined to be similar to the new organization.

Similar organizations to a new organization may be ones that share one or more attributes in common, such as industry, organization size (e.g., number of employees), geographic location of headquarters, and most common N job titles found at the organization.

Another way to identify similar organizations to a new organization is to identify tokens within content associated with the new organization. The content may include an organization (e.g., company) profile, a mission statement from the new organization, a press release associated with the new organization, one or more web pages hosted by the new organization, and/or one or more articles published by the new organization. Each identified token is mapped to a token reflected in matrix T in order to extract one or more token embeddings from matrix T. If multiple token embeddings are identified, then the multiple token embeddings are combined to generate a combined token embedding for the new organization. The same process may be performed relative to other (known) organizations in order to generate a combined token embedding for each other organization. If the token embedding of a known organization is similar to the combined token embedding for the new organization, then the known organization is considered a similar organization relative to the new organization and that known organization's target embedding can be used to determine (e.g., generate) a target embedding for the new organization.

Another possible way to determine a target embedding for a new organization is to average all the learned target embeddings in matrix V (or the latest version thereof), if the targets represented by matrix V correspond to organizations.

New Campaigns and Content Items

In an embodiment, targets in matrix M correspond to content delivery campaigns. If a content provider that has initiated a new content delivery campaign and matrix M stores data relevant to one or more other content delivery campaigns initiated by the content provider, then target embeddings learned for the one or more other content delivery campaigns may be combined (e.g., averaged) to generate a combined target embedding for the new content delivery campaign.

A similar approach may be performed if targets in matrix M correspond to content items. Thus, if a content provider provides a new content item to content delivery exchange and matrix M stores data relevant to one or more other content items provided by the content provider, then target embeddings learned for the one or more other content items may be combined (e.g., averaged) to generate a combined target embedding for the new content item.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
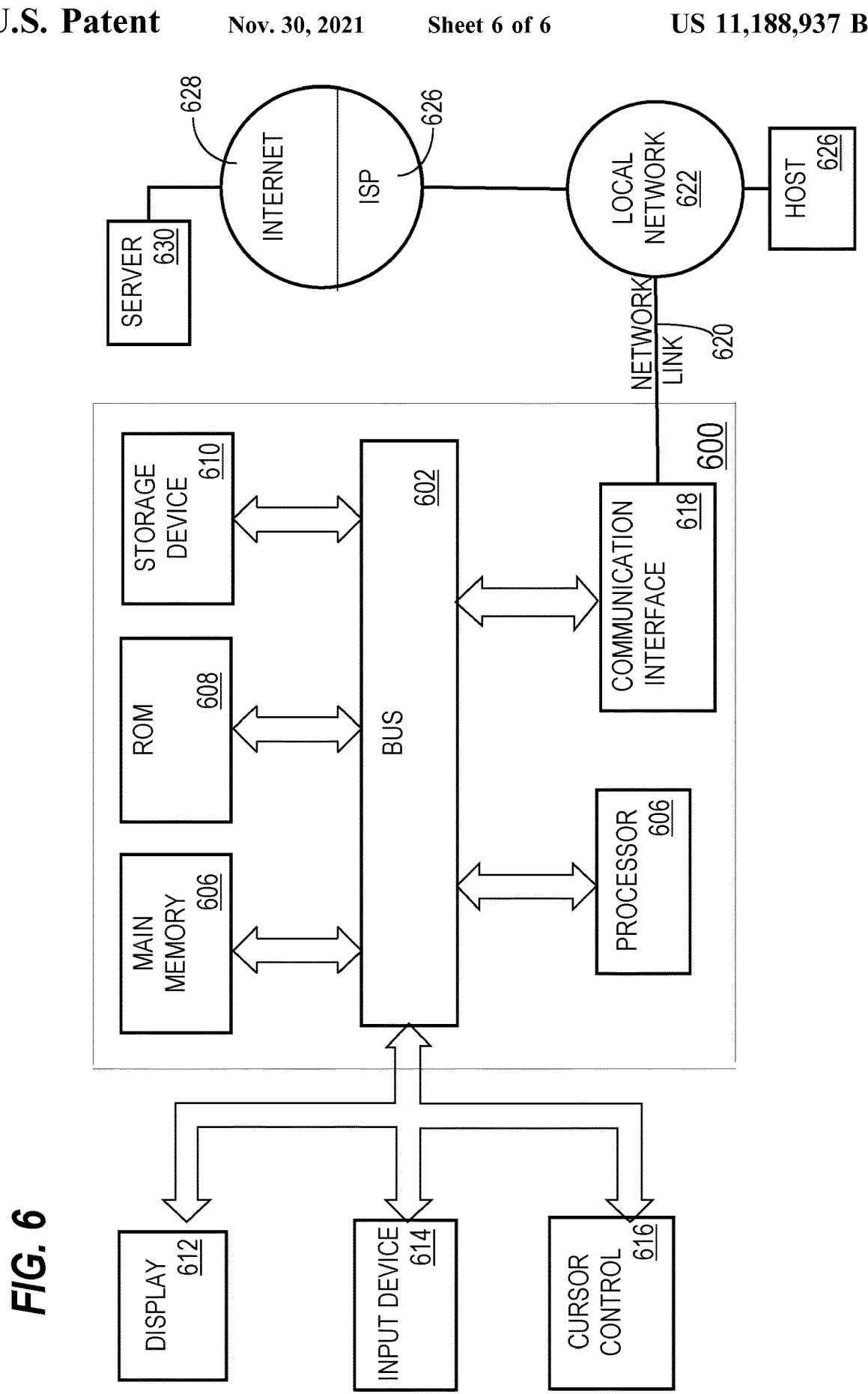
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from a plurality of computing devices, user-target interaction data items;
    generating, based on user-target interaction data items, a user-target interaction matrix that indicates that a subset of a plurality of users interacted with content items that are associated with one or more targets of a plurality of targets, wherein the plurality of targets are not users;
    for each electronic document in a plurality of electronic documents:
        identifying a target, from among the plurality of targets, that is associated with said each electronic document;
        identifying one or more tokens that are associated with the target and that reflect a semantic context of the target, wherein the one or more tokens are words or phrases that are associated with the target;
        associating the one or more tokens with the target;
    based on the associating, generating a token-target association matrix that indicates that a subset of a plurality of tokens are associated with one or more targets of the plurality of targets;
    using a machine learning technique to generate, based on the user-target interaction matrix and the token-target association matrix, a plurality of user embeddings and a plurality of target embeddings, wherein the plurality of user embeddings includes a user embedding for each user of the plurality of users and the plurality of target embeddings includes a target embedding for each target of the plurality of targets;
    wherein using the machine learning technique comprises implementing gradient descent to learn the plurality of user embeddings and the plurality of target embeddings by continuously adjusting the embeddings in the plurality of user embeddings and the plurality of target embeddings to minimize the same cost function;
    wherein each user embedding of the plurality of user embeddings corresponds to a different entity of the plurality of users and comprises a vector of real numbers, each real number corresponding to a different latent dimension of a plurality of latent dimensions,
    wherein each target embedding of the plurality of target embeddings corresponds to a different target of the plurality of targets and comprises a vector of real numbers, each real number corresponding to a different latent dimension of the plurality of latent dimensions,
    receiving, from a computing device of a particular user, a request for content;
    based on one or more user embeddings of the plurality of user embeddings, identifying a content item for the particular user;
    in response to receiving the request, causing the content item to be transferred over a computer network and presented through the computing device of the particular user;
    wherein the method is performed by one or more computing devices.

2. The method of claim 1, further comprising:
    determining to perform audience expansion for a particular content delivery campaign that is associated with the content item;

in response to determining to perform audience expansion for the particular content delivery campaign, identifying a plurality of affinity scores;
wherein each affinity score in the plurality of affinity scores is generated based on a particular target embedding, in the plurality of target embeddings, and a different user embedding in a subset of the plurality of user embeddings;
based on the plurality of affinity scores, identifying the particular user and associating the particular user with the particular content delivery campaign;
in response to receiving the request, identifying the particular content delivery campaign and identifying the content item.

3. The method of claim 1, further comprising:
in response to receiving the request:
identifying a plurality of candidate content delivery campaigns;
for each candidate content delivery campaign in the plurality of candidate content delivery campaigns:
identifying a plurality of feature values associated with the particular user and said each candidate content delivery campaign, wherein the plurality of feature values includes a feature value that is, or is based on, a particular user embedding from the plurality of user embeddings;
inputting the plurality of feature values into a prediction model to generate a predicted user selection rate for the particular user relative to said each content delivery campaign;
based on the predicted user selection rate generated for each of the plurality of candidate content delivery campaigns, selecting a particular content delivery campaign of the plurality of candidate content delivery campaigns, wherein the particular content delivery campaign is associated with the content item.

4. The method of claim 1, further comprising:
identifying a plurality of candidate content items, wherein each candidate content item is associated with a different target in a subset of the plurality of targets;
identifying a plurality of affinity scores, wherein each affinity score in the plurality of affinity scores is generated based on (1) a particular user embedding, in the plurality of user embeddings, that corresponds to the particular user and (2) a different target embedding in a subset of the plurality of user embeddings;
based on the plurality of affinity scores, selecting a subset of the plurality of candidate content items, wherein the subset includes the content item.

5. The method of claim 1, further comprising:
determining that the particular user is not one of the plurality of users;
in response to determining that the particular user is not one of the plurality of users, identifying the one or more user embeddings that are associated with one or more users that does not include the particular user.

6. The method of claim 5, wherein the one or more user embeddings are multiple user embeddings, the method further comprising:
generating, based on the multiple user embeddings, a combined user embedding;
wherein the content item is identified based on the combined user embedding.

7. The method of claim 1, further comprising:
determining that a particular target is not one of the plurality of targets;

in response to determining that the particular target is not one of the plurality of targets, identifying the one or more target embeddings that are associated with one or more targets, in the plurality of targets, that does not include the particular target;
based the one or more target embeddings and a particular embedding for the particular user, generating an affinity score for the particular user relative to the particular target;
wherein identifying the content item is based on the affinity score.

8. The method of claim 1, wherein the plurality of targets include organizations, content delivery campaigns, or content items.

9. The method of claim 1, wherein:
the user-target interaction data items are based on activity that occurred with respect to a plurality of feeds, each feed in the plurality of feeds corresponding to a different user in a subset of the plurality of users;
the content item is not presented in a feed of the particular user.

10. A method comprising:
receiving, from a plurality of computing devices, user-target interaction data items;
generating, based on user-target interaction data items, a user-target interaction matrix that indicates that a subset of a plurality of users interacted with items that are associated with one or more targets of a plurality of targets, wherein the plurality of targets are not users;
using one or more machine learning techniques to generate, based on the user-target interaction matrix, a plurality of user embeddings and a plurality of target embeddings, wherein the plurality of user embeddings includes an user embedding for each user of the plurality of users and the plurality of target embeddings includes a target embedding for each target of the plurality of targets;
wherein using the one or more machine learning techniques comprises implementing gradient descent to learn the plurality of user embeddings and the plurality of target embeddings by continuously adjusting the embeddings in the plurality of user embeddings and the plurality of target embeddings to minimize the same cost function;
wherein each user embedding of the plurality of user embeddings corresponds to a different user of the plurality of users and comprises a vector of real numbers, each real number corresponding to a different latent dimension of a plurality of latent dimensions,
wherein each target embedding of the plurality of target embeddings corresponds to a different target of the plurality of targets and comprises a vector of real numbers, each real number corresponding to a different latent dimension of the plurality of latent dimensions,
determining to expand a target audience of a content delivery campaign that includes a set of targeting criteria that defines the target audience, wherein the target audience comprises a set of multiple users, each of which satisfies the set of targeting criteria;
based on multiple user embeddings in the plurality of user embeddings and a particular target embedding associated with the content delivery campaign, generating a plurality of affinity scores, each corresponding to a different user embedding of the multiple user embeddings;
based on the plurality of affinity scores, identifying a subset of the plurality of users for adding to the target audience, wherein none of the users in the subset satisfy the set of targeting criteria;

wherein the method is performed by one or more computing devices.

11. The method of claim 10, wherein none of the targets in the plurality of targets corresponds to the content delivery campaign, the method further comprising:

based on one or more attributes of the content delivery campaign, identifying a particular target in the plurality of targets;

wherein the particular target embedding is associated with the particular target.

12. A method comprising:

receiving, from a plurality of computing devices, user-target interaction data items;

generating, based on user-target interaction data items, a user-target interaction matrix that indicates that a subset of a plurality of users interacted with content items that are associated with one or more targets of a plurality of targets, wherein the plurality of targets are not users;

using one or more machine learning techniques to generate, based on the user-target interaction matrix, a plurality of user embeddings and a plurality of target embeddings, wherein each user embedding for each user of the plurality of users and a target embedding for each target of the plurality of targets;

wherein using the one or more machine learning techniques comprises implementing gradient descent to learn the plurality of user embeddings and the plurality of target embeddings by continuously adjusting the embeddings in the plurality of user embeddings and the plurality of target embeddings to minimize the same cost function;

wherein each user embedding of the plurality of user embeddings corresponds to a different user of the plurality of users and comprises a vector of real numbers, each real number corresponding to a different latent dimension of a plurality of latent dimensions, wherein each target embedding of the plurality of target embeddings corresponds to a different target of the plurality of targets and comprises a vector of real numbers, each real number corresponding to a different latent dimension of the plurality of latent dimensions, in response to receiving a request that is associated with a particular user:

identifying, by a computer system in real-time, a plurality of candidate content delivery campaigns;

for each candidate content delivery campaign in the plurality of candidate content delivery campaigns:

identifying a plurality of feature values associated with the particular user and said each candidate content delivery campaign, wherein the plurality of feature values includes a feature value that is, or is based on, a particular user embedding from the plurality of user embeddings;

inputting the plurality of feature values into a prediction model to generate a predicted user selection rate for the particular user relative to said each content delivery campaign;

based on the predicted user selection rate generated for each of the plurality of candidate content delivery campaigns, selecting a particular content delivery campaign of the plurality of candidate content delivery campaigns;

causing a content item that is associated with the particular content delivery campaign to be presented through a computing device of the particular user;

wherein the method is performed by one or more computing devices.

13. One or more non-transitory storage media storing instructions which, when executed by one or more processors, cause performance of the method recited in claim 1.

14. One or more non-transitory storage media storing instructions which, when executed by one or more processors, cause performance of the method recited in claim 2.

15. One or more non-transitory storage media storing instructions which, when executed by one or more processors, cause performance of the method recited in claim 3.

16. One or more non-transitory storage media storing instructions which, when executed by one or more processors, cause performance of the method recited in claim 4.

17. One or more non-transitory storage media storing instructions which, when executed by one or more processors, cause performance of the method recited in claim 5.

18. One or more non-transitory storage media storing instructions which, when executed by one or more processors, cause performance of the method recited in claim 10.

19. One or more non-transitory storage media storing instructions which, when executed by one or more processors, cause performance of the method recited in claim 12.

* * * * *